US012502319B2

(12) United States Patent
Peterson et al.

(10) Patent No.: US 12,502,319 B2
(45) Date of Patent: Dec. 23, 2025

(54) CONVERTIBLE RAMP SYSTEM FOR A VEHICLE

(71) Applicant: The Braun Corporation, Winamac, IN (US)

(72) Inventors: Kenneth Edward Peterson, Winamac, IN (US); Robert E. Bettcher, III, Winamac, IN (US); Chad Michael Towels, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 749 days.

(21) Appl. No.: 17/880,841

(22) Filed: Aug. 4, 2022

(65) Prior Publication Data
US 2023/0039385 A1 Feb. 9, 2023

Related U.S. Application Data

(60) Provisional application No. 63/229,620, filed on Aug. 5, 2021.

(51) Int. Cl.
*B60P 1/43* (2006.01)
*A61G 3/06* (2006.01)

(52) U.S. Cl.
CPC .............. *A61G 3/061* (2013.01); *B60P 1/43* (2013.01)

(58) Field of Classification Search
CPC ... A61G 3/06; A61G 3/061; B60P 1/43; B60P 1/433

(Continued)

(56) References Cited

U.S. PATENT DOCUMENTS 4,084,713 A * 4/1978 Rohrs .................... A61G 3/061
414/537
5,193,878 A 3/1993 Weaver
(Continued)

FOREIGN PATENT DOCUMENTS

| CA | 2284804 A1 | * | 3/2000 | ............. A61G 3/061 |
| GB | 2609402 A | * | 2/2023 | ............. A61G 3/061 |
| WO | WO-9903704 A1 | * | 1/1999 | ............. A61G 3/067 |

OTHER PUBLICATIONS

International Search Authority (European Patent Office), Invitation to Pay Additional Fees, PCT/US2022/039378, Nov. 4, 2022 (7 pages).

(Continued)

*Primary Examiner* — Gary S Hartmann
(74) *Attorney, Agent, or Firm* — Daniel Tallitsch; Tyler Schultz

(57) ABSTRACT

A system and method of converting a wheelchair ramp system from one of a manual mode or a power mode to the other of a manual mode or a power mode. The wheelchair ramp system includes a bimodal bracket having a common spindle aperture, a common ramp, a common ramp fold arm, and a common fold arm collar. The bimodal bracket supports either a spring for the manual mode or a motor for the power mode. The common spindle aperture accepts a spindle of the spring or a spindle of the motor, each of which is captured by the common fold arm collar. The common ramp fold arm is coupled to the common fold arm collar and to the common ramp. A common stow switch is fixed to a bracket and a position of the bracket is used in both the manual mode and the power mode to adjust a stow position of the ramp.

18 Claims, 12 Drawing Sheets

(58) Field of Classification Search
USPC ......................................................... 414/921
See application file for complete search history.

(56) References Cited

U.S. PATENT DOCUMENTS

| | | | |
|---|---|---|---|
| 5,672,041 A | 9/1997 | Ringdahl et al. | |
| 7,527,467 B2* | 5/2009 | Edwards | B60P 1/431 |
| | | | 414/921 |
| 7,908,695 B2* | 3/2011 | Budd | A61G 3/061 |
| | | | 14/71.3 |
| 2007/0131883 A1 | 6/2007 | Goodrich et al. | |
| 2023/0043284 A1* | 2/2023 | Hartsock | A61G 3/061 |

OTHER PUBLICATIONS

International Search Authority (European Patent Office), International Search Report, Search Strategy, and Written Opinion, PCT/US2022/039378, Nov. 4, 2022 (15 pages).

\* cited by examiner

CONVERTIBLE RAMP SYSTEM FOR A VEHICLE

CROSS REFERENCE TO RELATED APPLICATIONS

This application claims priority to U.S. Provisional Patent Application No. 63/229,620, filed on Aug. 5, 2021 and entitled CONVERTIBLE RAMP SYSTEM FOR A VEHICLE, the contents of which is incorporated herein by reference.

FIELD

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration a van is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry and exit of the physically limited individual through what is known as the assisted entrance. Once inside the van, an individual who uses the assisted entrance is located in a rear passenger compartment of the van adjacent to or behind the assisted entrance. In other configurations, the van is retrofitted to allow an individual in a wheelchair to be located throughout the van including the same location as the front row seats.

In one known retrofitted van, the ramp includes a stored position and a deployed position. In a manual ramp system, the ramp is moved from the stowed position to the deployed position manually by an individual who must physically move the ramp between positions. In an automatic ramp system, the ramp moves from the stowed position to the deployed position and back to the stowed position in response to actuation of an electronic device, such as by actuation of a pushbutton located at a user console or actuation of a pushbutton located on a remote control device.

When a vehicle is ordered or purchased by an individual, the individual typically decides which ramp system, either the manual system or the automatic system, is preferred. In some cases, if the individual purchases a vehicle with a manual system, but later decides that an automatic system is preferred, the manual system must be removed and replaced with an automatic system. Such a change, however, can require a large expenditure as well as a significant amount of time to make the change. Consequently, what is needed therefore is a ramp system that reduces the time and expense required to make the change.

SUMMARY

In one embodiment, there is provided a convertible wheelchair ramp system for a vehicle, wherein the convertible wheelchair ramp system includes a manual ramp configuration and a power ramp configuration. The convertible wheelchair ramp system includes a bimodal bracket having a spindle aperture configured to engage a first spindle in a manual ramp mode and to engage a second spindle in a power ramp mode. A common ramp assembly, for use in both the manual ramp mode and the power ramp mode, includes a first ramp plate rotatably coupled to the first spindle in the manual ramp mode and through the second spindle in the power ramp mode. The first ramp plate includes a chain wheel mounting location. A common ramp fold arm for use in both of the manual ramp mode and the power ramp mode is fixedly coupled to the first ramp plate and rotatably coupled to the bimodal bracket. A common fold arm collar is configured to separately mount to either of the first spindle in the manual ramp mode or to the second spindle in the power ramp mode, wherein mounting of the common fold arm collar to the first spindle provides for the manual ramp configuration and the mounting of the common fold arm collar to the second spindle provides for the power ramp configuration.

In some embodiments, the convertible wheelchair ramp system further includes a motor operatively connected to the second spindle, wherein the second spindle extends through the spindle aperture in the power ramp configuration.

In some embodiments, the convertible wheelchair ramp system further includes comprising a spring operatively connected to the first spindle, wherein the first spindle extends through the spindle aperture in the manual ramp configuration.

In some embodiments, the convertible wheelchair ramp system further includes a stow switch supported by the bimodal bracket in both the manual ramp mode and the power ramp mode.

In some embodiments, the convertible wheelchair ramp system further includes a stow switch housing including a cutout, the stow switch housing surrounding the stow switch and the cutout exposing a switch arm of the stow switch.

In some embodiments, the convertible wheelchair ramp system further includes a projection connected to the common fold arm, wherein movement of the common fold arm moves the projection into and out of contact with the switch arm to determine a condition of the stow position.

In some embodiments, the convertible wheelchair ramp system further includes a deploy switch supported by the bimodal bracket in the power ramp mode.

In some embodiments, the convertible wheelchair ramp system further includes a position cam supported by the bimodal bracket in the power ramp mode, wherein the position cam is located adjacent to the deploy switch and the deploy switch determines a position of the ramp based on a relationship between the deploy switch and the cam.

In some embodiments, the convertible wheelchair ramp system further includes wherein the spindle of the motor includes a ramp arm key configured to engage the common fold arm collar.

In some embodiments, the convertible wheelchair ramp system further includes a chain link coupled to the common ramp fold arm and a chain cam coupled to the chain link and to a second ramp plate coupled to the first ramp plate, wherein actuation of the motor extends the second ramp plate with respect to the first ramp plate to deploy the common ramp assembly.

In another embodiment, there is provided a method of converting a wheelchair ramp system from one of a manual mode or a power mode to the other of the manual mode or the power mode, wherein the wheelchair ramp system includes a bimodal bracket having a spindle aperture, a common ramp, a common ramp fold arm, and a common fold arm collar. The method includes: identifying if the wheelchair ramp system is configured in the manual mode or in the power mode; if the wheelchair ramp system is configured in the manual mode, convert the wheelchair ramp system to the power mode by: removing the common ramp fold arm from the common fold arm collar, removing the common fold arm collar from a clock spring spindle of a clock spring assembly; removing the clock spring from the bimodal bracket; inserting a motor spindle of a motor assembly through the spindle aperture; coupling the common fold arm collar to the motor spindle, and coupling the common ramp fold arm to the fold arm collar; and if the wheelchair ramp system is configured in the power mode, convert the wheel chair ramp system to the manual mode by: removing the common ramp fold arm from the common fold arm collar; removing the common fold arm collar from a motor spindle of a motor assembly; removing the motor assembly from the bimodal bracket; inserting a clock spring spindle of a clock spring assembly through the spindle aperture; coupling the common fold arm collar to the clock spring spindle; and coupling the common ramp fold arm to the common fold arm collar.

In some embodiments, the method of converting a wheelchair ramp system further includes wherein if the wheelchair ramp system is configured in the manual mode, attaching a chain assembly to the common ramp fold arm.

In some embodiments, the method of converting a wheelchair ramp system further includes a chain, a chain link coupled to the chain, a chain wheel, and a chain cam coupled to the chain.

In some embodiments, the method of converting a wheelchair ramp system further includes if the wheelchair ramp system is configured in the manual mode, connecting the chain wheel and the chain cam to the common ramp, connecting the chain link to the common ramp fold arm, and placing the chain in contact with the chain wheel.

In some embodiments, the method of converting a wheelchair ramp system further includes if the wheelchair ramp system is configured in the manual mode, attaching a deploy switch and a cam to the bimodal bracket, wherein contact of the deploy switch with the cam determines a deploy position of the common ramp in the power mode.

In some embodiments, the method of converting a wheelchair ramp system further includes if the wheelchair ramp system is configured in the power mode, attaching a clock spring retainer plate to the bimodal bracket prior to inserting the clock spring spindle through the spindle aperture.

In a further embodiment, there is provided a method of converting a manual wheelchair ramp system to a power wheelchair ramp system, wherein the manual wheelchair ramp system includes a bimodal bracket supporting a spring having a spring spindle extending through a bimodal bracket aperture of the bimodal bracket, a common ramp including a common ramp fold arm and a common fold arm collar. The method includes: removing the common fold arm collar from the common ramp fold arm and the spindle of the spring; removing the spindle of the spring from the bimodal bracket aperture while removing the spring from the bimodal bracket; attaching a motor having a motor spindle to the bimodal bracket by inserting the motor spindle into the bimodal bracket aperture and fixedly connecting the motor to the bimodal bracket; attaching the common fold arm collar to the motor spindle; attaching the common ramp fold arm to the common fold arm collar; and attaching the common ramp fold arm to the ramp.

In some embodiments, the method of converting a manual wheelchair ramp system to a power wheelchair ramp system further includes attaching a chain link assembly to the common ramp fold arm and the common ramp.

In some embodiments, the method of converting a manual wheelchair ramp system to a power wheelchair ramp system further includes adjusting a relationship between a stow position switch and the common ramp in a stow position to set the stow position of the common ramp.

In some embodiments, the method of converting a manual wheelchair ramp system to a power wheelchair ramp system further includes attaching a deploy position switch to the bimodal bracket and adjusting a relationship between the deploy position switch and a cam coupled to the spindle to set the deploy position of the common ramp.

In still another embodiment, there is provided a kit for converting a manual wheelchair ramp system to a power wheelchair ramp system, wherein the manual wheelchair ramp system and the power wheelchair ramp system include a bimodal bracket common to both the manual wheelchair ramp system and the power ramp system. The kit includes: a motor; a spindle key: a motor spindle cam; a microswitch; and a chain link assembly.

In some embodiments, the kit further includes a clock spring retainer.

In some embodiments, the kit further includes a key fob.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
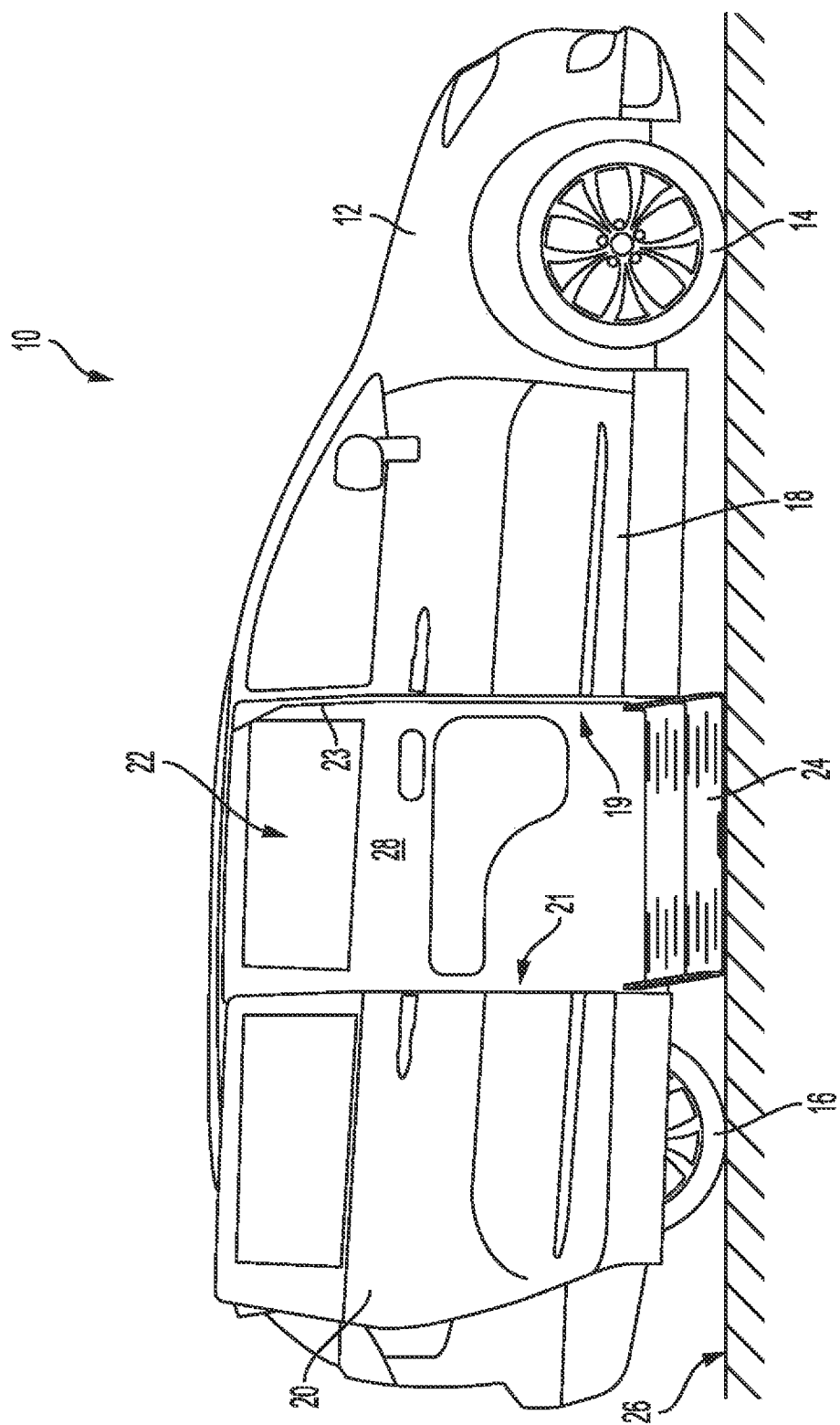
FIG. 1 illustrates an elevational side view of a passenger vehicle including an access ramp.

FIG. 1 illustrates a vehicle 10, commonly identified as a passenger van, available from any number of United States and foreign manufacturers. In the illustrated embodiment, the vehicle 10 includes a unibody construction, but other vehicles having a frame on body construction, are also included in the present disclosure. Consequently, the use of vehicle herein includes all types and kinds of vehicles with a body on frame construction, a unibody construction, or other constructions. In addition, while the passenger van 10 is illustrated in FIG. 1, the present disclosure is directed to all passenger vehicles carrying one or more passengers.

The vehicle 10 includes a body 12 operatively coupled to front wheels 14 and rear wheels 16. The vehicle 10 includes a unibody construction. A first passenger side door 18 is located between the front wheels 14 and rear wheels 16 and provides access to a passenger for sitting in a front seat of the vehicle adjacent to the driver.

The vehicle 10 includes a second passenger side door 20 coupled to the unibody frame through a sliding mechanism including three tracks. Other numbers of tracks are possible. The sliding mechanism is modified to slide along the tracks to increase the size of an opening 22 to the interior. The widened opening 22 provides improved access to a passenger seated in a wheelchair. The opening is defined on the sides thereof by an edge 19 of a B-pillar 23 and the edge 21 of the door 20. The vehicle is further modified to include a ramp assembly 24 which provides rolling access of a wheelchair from pavement 26 into an interior 28 of the vehicle 10. The ramp assembly 24 is installed at the opening 22 and is movable between the interior of the vehicle, where it is stored in some embodiments, and to the exterior for wheelchair access.

In known modified vehicles, such as the modified van, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. In other configurations, the wheelchaired passenger is not limited to the middle row. As used herein, a wheelchaired passenger is used to indicate that the individual is making use of a wheelchair, whether that use is temporary or permanent.

Figure 2:
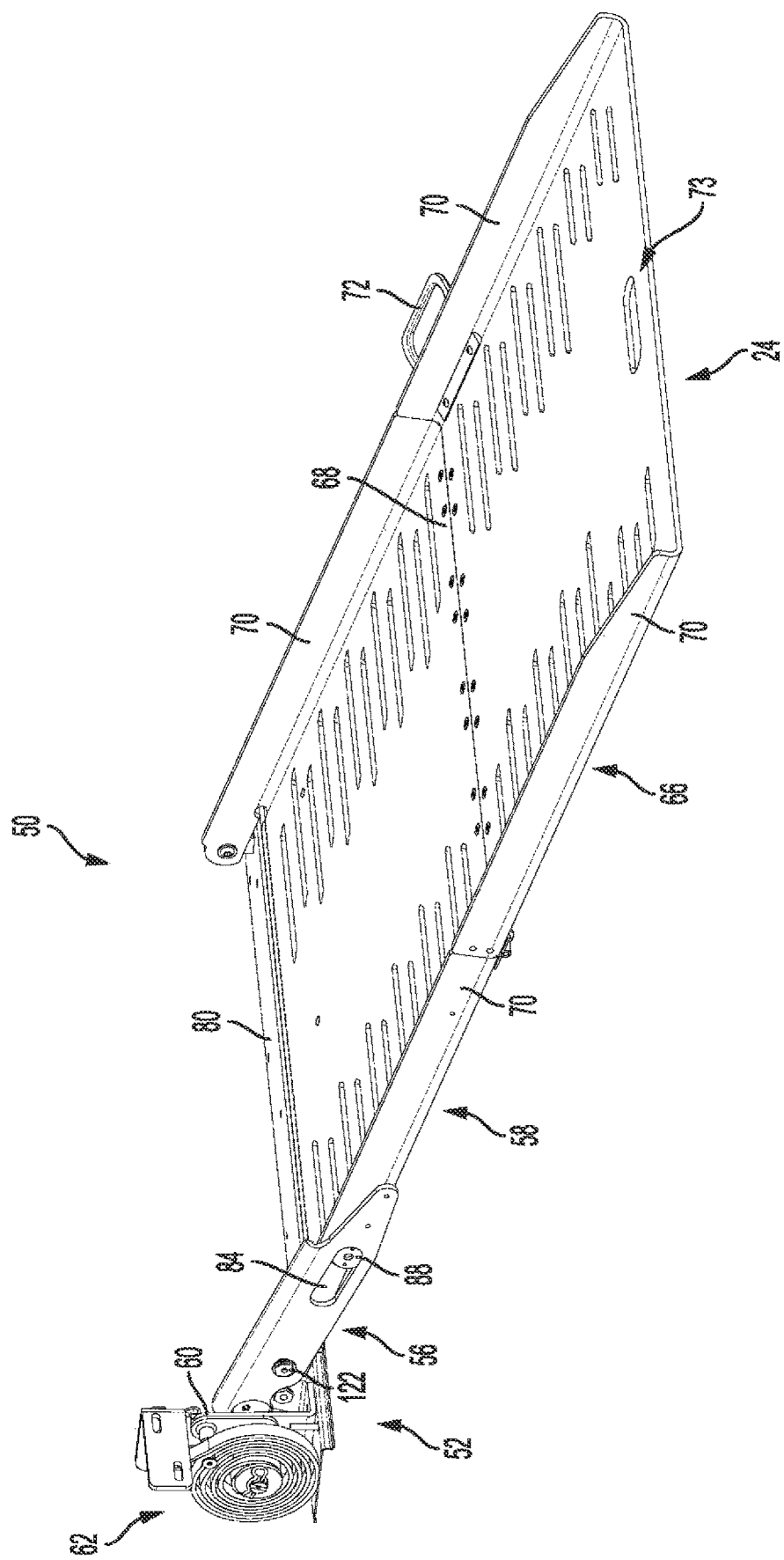
FIG. 2 illustrates a convertible ramp system in a manual mode for a passenger vehicle.

FIG. 2 illustrates one embodiment of a convertible ramp system 50 for the vehicle 10. In FIG. 2, the convertible ramp system 50 is configured in a manual ramp mode 52 which includes the ramp assembly 24 of FIG. 1. In another embodiment described in FIG. 3, the convertible ramp system 50 is configured in a power ramp mode configuration 54 which also includes the ramp assembly 24. In each embodiment of the manual ramp mode configuration 52 and the power ramp mode configuration 54, not only is the ramp assembly 24 shared, i.e. common, between the two modes, but each mode also includes the use of a shared (common) ramp fold arm 56, which is operatively connected between a first ramp plate 58 and a bimodal bracket 60. The bimodal bracket 60, when the convertible ramp system 50 is configured in the manual ramp mode configuration 52, supports a manual ramp assembly 62. The bimodal bracket 60 when the convertible ramp system is configured in the power ramp mode 54 supports a power ramp assembly 64. In each of the manual modes and power modes, the bidmodal bracket 60 remains unchanged and is configured to accept the manual ramp assembly 62 and the power ramp assembly 64 without modification to the structure of the bimodal bracket 60. The bimodal bracket 60 is therefore a common bracket which does not change, in one or more embodiments, between the manual mode and the power mode. Consequently, the bimodal bracket 60 is not modified when changing the ramp system from a manual ramp system to a power ramp system or when changing from the power ramp system to the manual ramp system.

The first ramp plate 58 is rotatably coupled to a second ramp plate 66 at a hinged location 68. Sidewalls 70 extend along the outer edges of each of the first ramp plate 58 and the second ramp plate 66. In the manual ramp mode configuration 52, a handle 72 is connected to the second ramp plate 66 to enable an individual to move the ramp assembly 24 from a deployed position in which the second ramp plate 66 contacts the ground or pavement to enable a wheelchaired person to enter and exit the vehicle 10 by moving up and down the ramp assembly 24. The handle 72 also enables an individual to raise the ramp assembly 24 to a stowed position located within the vehicle 10. An oval slot 73, included in ramp plate 66, provides another location for a user to move the ramp assembly 24. In other embodiments, the ramp assembly 24 includes a single ramp plate or three or more ramp plates connected together.

Figure 4:
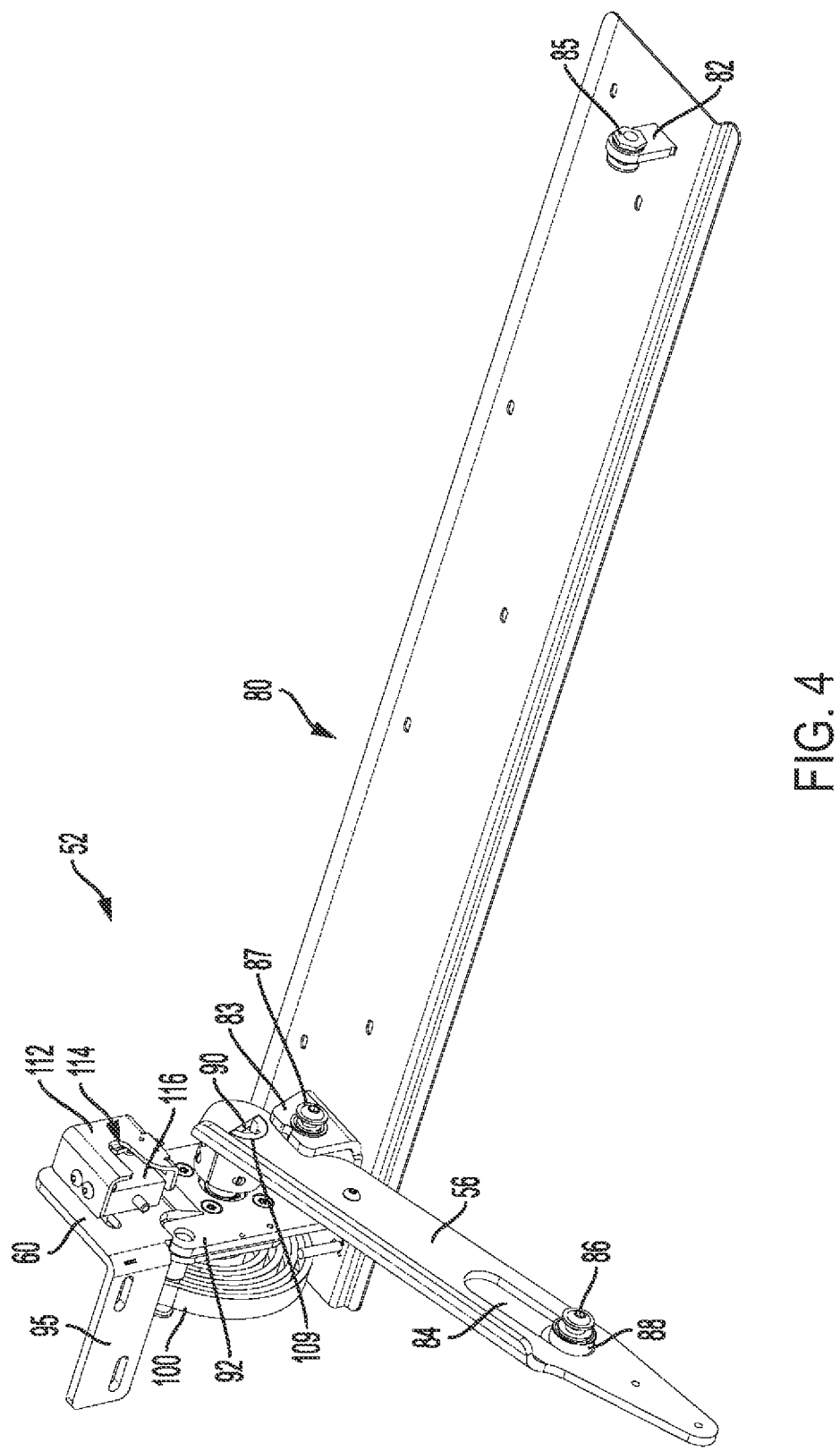
FIG. 4 illustrates a manual ramp system coupled to a ramp fold arm and a floor plate.

FIG. 4 illustrates one embodiment of the manual ramp system 52 coupled to the ramp fold arm 56 and a floor plate 80. The floor plate 80 is attached to the floor of the vehicle 10. The ramp fold arm 56 is rotatably coupled to the bimodal bracket 60 and each of the sides of the first ramp plate 58 is rotatably coupled to a standoff 82 and a standoff 83, which are fixedly coupled to the floor plate 80. The standoff 83 is configured as part of the bimodal bracket 60. In another embodiment, standoff 83 is separate from the bimodal bracket 60. In still other embodiments, the bimodal bracket 60, the standoff 82, and the standoff 83, are fixedly connected to a floor of the vehicle 10 and the floor plate 80 is not included. Each of the standoffs 82 and 83 respectively 87 support pivot pins 85 and 87 to which first ramp plate 58 is rotatably coupled.

The ramp fold arm 56 includes a slot 84 that is configured to receive a roller pin 86 supporting a roller 88. The roller pin 86 is fixedly connected to the first ramp plate 58 in both the manual ramp mode configuration 52 of FIG. 2 and the power ramp mode configuration 54 of FIG. 3. The roller 88, supported by the roller pin 86, extends into the slot 84. As the ramp assembly 24 is raised or lowered, the roller 88 engages slot 84. In either the manual mode 52 or power mode 54, the ramp fold arm 56 rotates about a rotational axis 90 at one end of the ramp fold arm 56 during raising and lowering the ramp assembly 24. As the ramp assembly 24 moves between deployed and stowed positions, the roller 88 moves along the slot 84.

Figure 5:
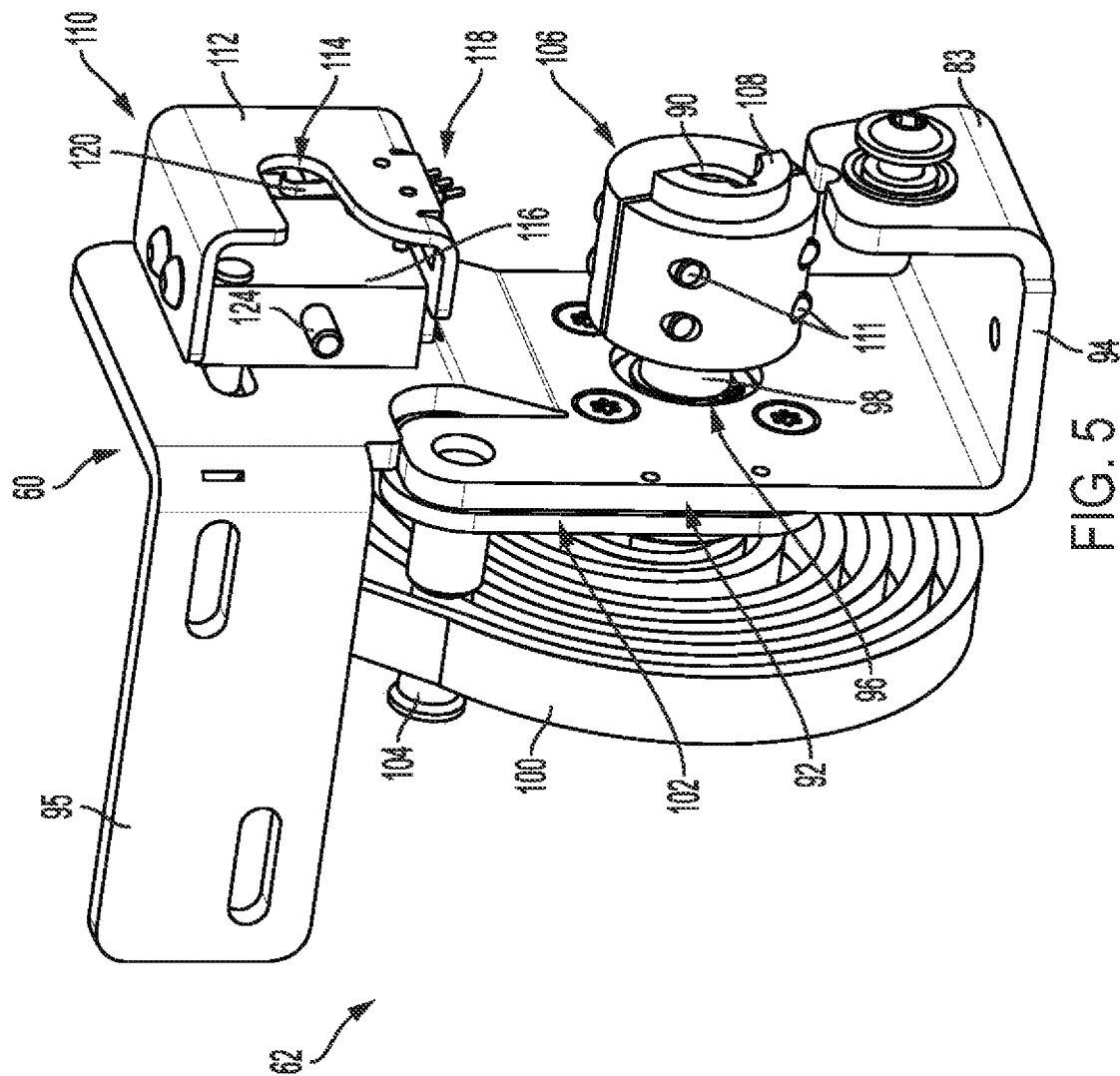
FIG. 5 illustrates a manual ramp system having a bimodal bracket.

FIG. 5 illustrates the manual ramp assembly 62 that includes the bimodal bracket 60. The bimodal bracket includes a vertically oriented portion 92 extending from a foot 94 which includes the standoff 83. The foot 94 is connected to the floor plate 80. A support bracket 95 extends laterally from the vertically oriented portion 92 and is configured to attach to the vehicle, such as the frame or other support structure, to support the bimodal bracket 60. The portion 92 includes a spindle aperture 96 which is configured to receive a spindle 98 of a clock spring 100. When ramp system is configured in the power ramp mode configuration 54, the spindle aperture 96 receives a spindle of a motor.

Figure 6:
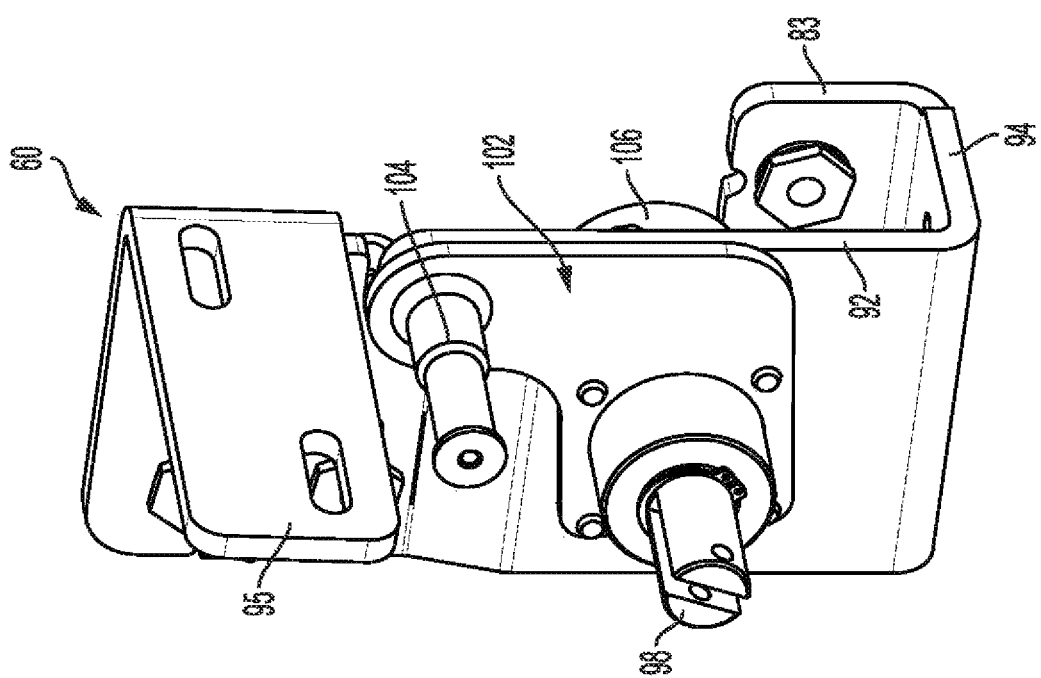
FIG. 6 illustrates a first perspective view of bimodal bracket, lacking a clock spring, for a manual ramp system.

The clock spring 100 is connected to the vertically oriented portion 92 by a clock spring retainer plate 102 as also seen in FIG. 6. The clock spring retainer plate 102 holds the spindle 96 98 at the aperture 96 and also supports a clock spring pin 104. The clock spring pin 104 holds the clock spring 100 under tension as the ramp assembly 24 moves from the stowed position to the deployed position and back to the stowed position. A fold arm collar 106 is connected to the spindle 98 and includes a curved projection 108 which is configured to fit in a corresponding curved slot 109 of the ramp fold arm 56. (See FIG. 4). Movement of the ramp assembly 24, moves the ramp fold arm 56, and rotates the spindle 98 about the rotational axis 90. Engagement of the curved projection 108 with the slot 109 of ramp fold arm 56, moves the ramp fold arm 56 and the ramp assembly 24 in response to movement of the spindle 98. The fold arm collar 106 is a common part that is used without modification, in both the manual mode and the power mode. In one embodiment, the common fold arm collar 106 is a two-part collar in which a first half and a second half are secured together with connectors 111.

As further seen in FIG. 5, the bimodal bracket 60 supports a stow position switch assembly 110 including a housing 112 having an aperture, such as a cutout 114. The housing 112 is fixedly connected to the vertically oriented portion 92. A sliding block 116, located within the housing 112, is fixedly attached to the housing 112. When the sliding block 116 and housing 112 are coupled together, both parts are moveable with respect to the bimodal bracket 60. An adjustment screw 124 adjusts the position of the combined housing 112 and sliding block 116 along the bimodal bracket 60. A stow switch 118, fixedly attached to the sliding block 116, includes a switch arm 120. The switch 118 is electrically coupled to a controller by a cable (See FIG. 11) which transmits a condition of the switch 118, which is either an open condition or a closed condition. In one embodiment, the switch 118 is a microswitch. Other types of switches are contemplated. The switch arm 120 opens and closes the switch 118 and is deflected by contact with a projection 122 (See FIG. 3) of the ramp fold arm 56. As the ramp assembly 24 is moved to the stowed position, the projection 122 contacts the arm 120 which closes the switch 118 to provide a signal that the ramp assembly 24 has reached the stowed position. Since a preferred location of the stowed position can change depending on the vehicle in which the ramp is located, the stow position is adjustable by adjusting the position of the sliding block 116 within the housing 112. The adjustment screw 124, when adjusted, adjusts the position of the switch arm 120, and consequently the position of the ramp assembly 24 when moved to the stow position. While the stow switch 118 is not used in the manual mode, it is installed with an initial installation of the ramp system 52, to reduce the time to convert the ramp assembly 24 from the manual mode to the power mode. In other embodiments, the stow switch 118 is not included with the ramp assembly 24, but is added later during conversion. The stow switch 118, when the ramp is in the power mode, is used to cut power the ramp assembly 24, once the ramp assembly 24 reaches the fully stowed position.

Figure 7:
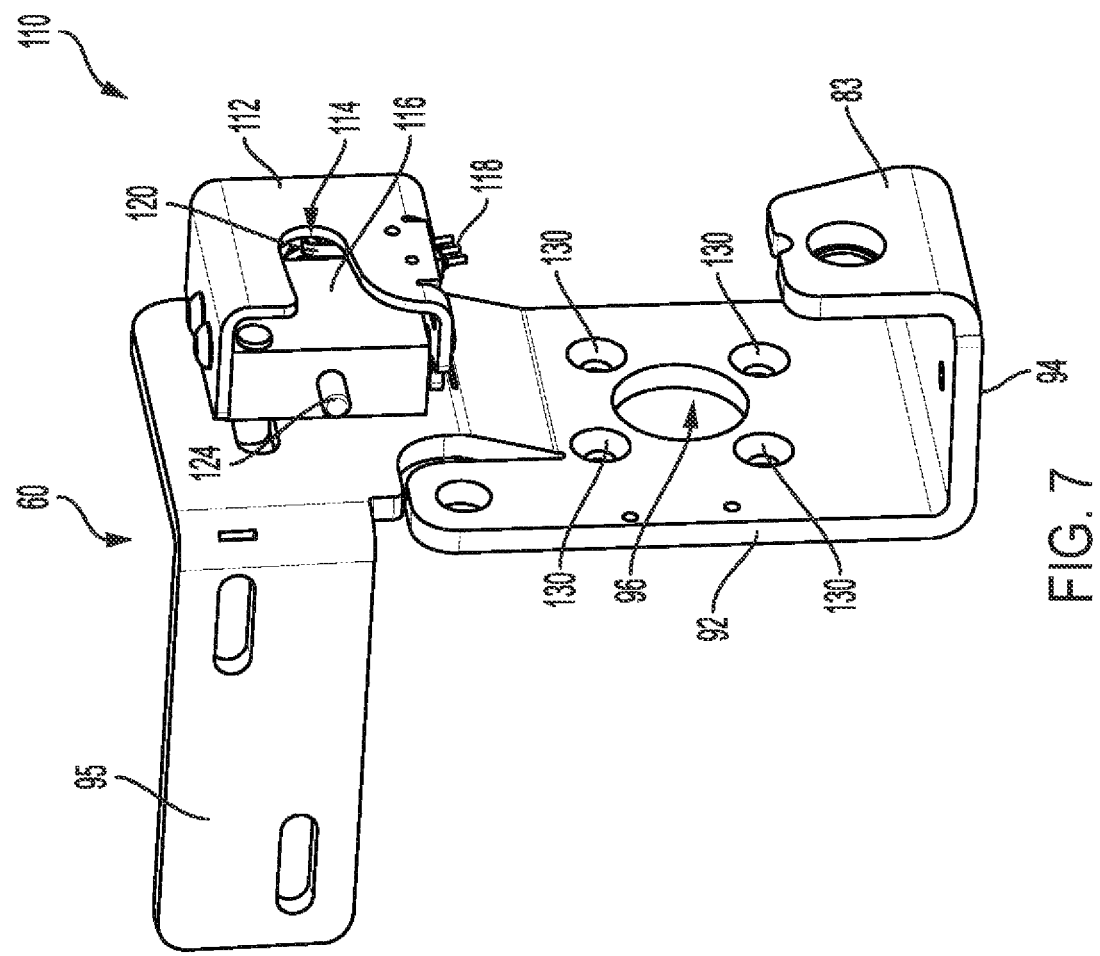
FIG. 7 illustrates a second perspective view of bimodal bracket, lacking a clock spring, for a manual ramp system.
Figure 8:
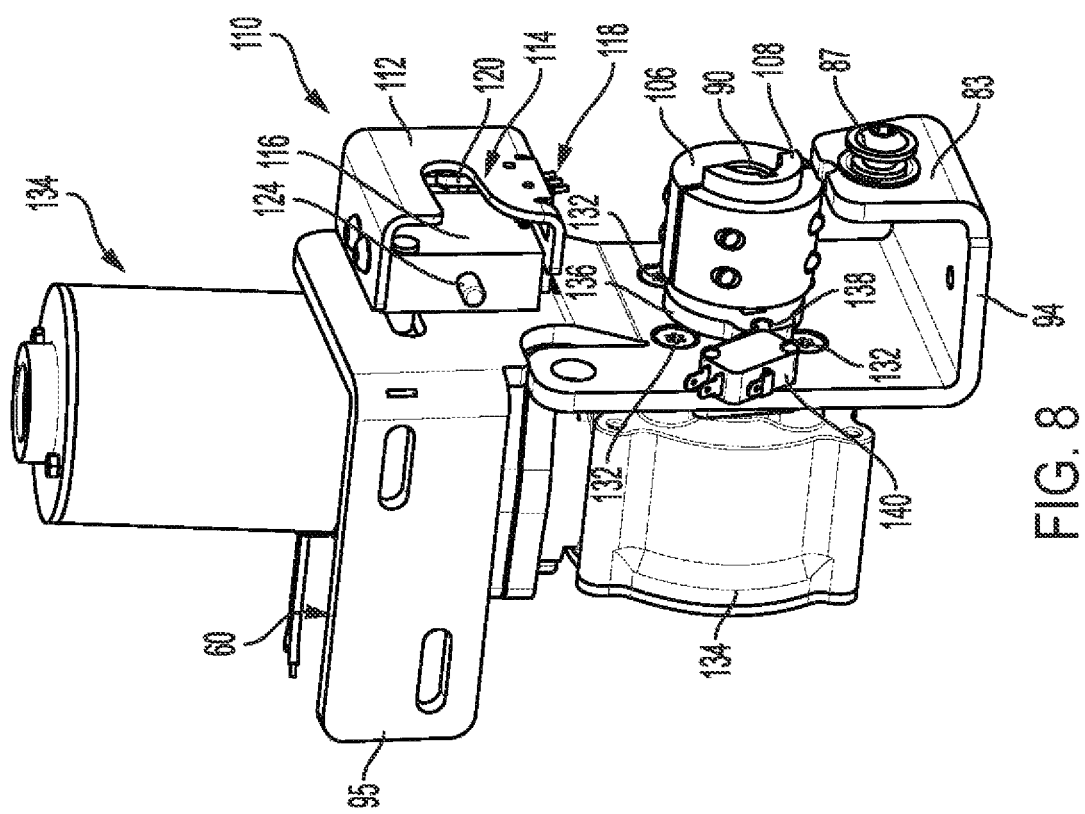
FIG. 8 illustrates a power ramp system having a bimodal bracket.
Figure 9:
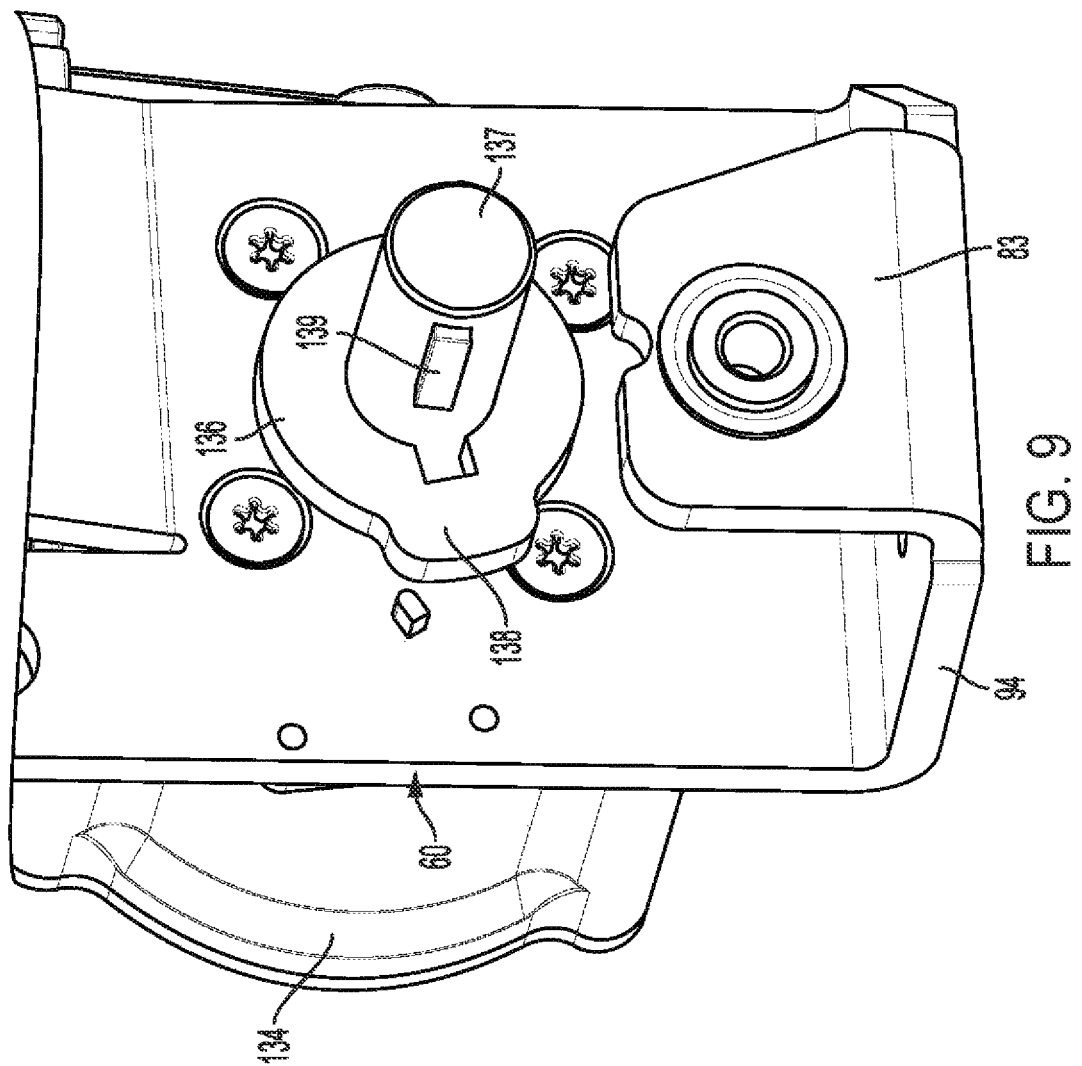
FIG. 9 illustrates a bimodal bracket supporting a motor, a spindle key and an extension of the spindle key.

To prepare the convertible ramp system 50 for the power ramp mode 54, the clock spring spindle 98, the clock spring 100, the clock spring retainer plate 102, the clock spring pin 104, and the fold arm collar 106 are removed as seen in FIG. 7. The stow position switch assembly 110 remains and is used in the power ramp mode. Once the clock spring assembly is removed, apertures 130 are exposed to accept connectors 132 which are received by corresponding apertures in a motor 134 (See FIG. 8). The motor 134 includes a spindle 137 that is inserted through the aperture 96. Once inserted, the connectors 132 are secured to the motor 134 and a cam 136 is placed over the spindle. A spindle key 139 is connected to the spindle 137 with a set screw (not shown). The spindle key 139 includes an extension that extends into a recess, or keyway, located in the spindle 137. The spindle key 139 is then aligned with a keyway located in the fold arm collar 108 of FIG. 8.

The cam 136 includes a projection 138 which is configured to contact a switch arm of a deploy switch 140 which is attached to the vertically oriented portion 92. The cam 136 is fixedly connected to the motor spindle and rotates about the axis 90 as the motor spindle turns. The deploy switch 140 is used during deployment of the ramp assembly 24 to cut power to the motor 134. Once the ramp assembly 24 reaches a predetermined position, determined by contact of the cam 136 with the arm of switch 140, the power to the motor 134 is turned off. In one embodiment, the predetermined position is around a horizontal position. Once power to motor 134 is turned off, the ramp assembly 24 gradually lower itself to the ground to complete deployment of the ramp assembly 24. The inherent resistance of the spindle to turning once the power is turned off lowers the ramp relatively slowly to ground to prevent the ramp assembly 24 from contacting the ground with too much force. In one embodiment, the deploy switch 140 is a microswitch. Other types of switches are contemplated.

The location of the projection 138 with respect to the arm of the deploy switch 140 is adjustable. By rotating the cam 136 around the spindle, the projection 138 is repositioned to a location to provide for accurate deployment of the ramp. In another embodiment, the cam 136 is fixed and the position of the switch 140, and therefore its arm, can be adjusted with respect to the projection 138. Adjustment of the switch 140 position and/or the cam 136 position allows gravity to complete the deploy operation. This ensures that the ramp motor 134 shuts off before the ramp assembly 24 reaches the horizontal position or just below the horizontal position to provide for full extension of the ramp assembly 24.

Figure 3:
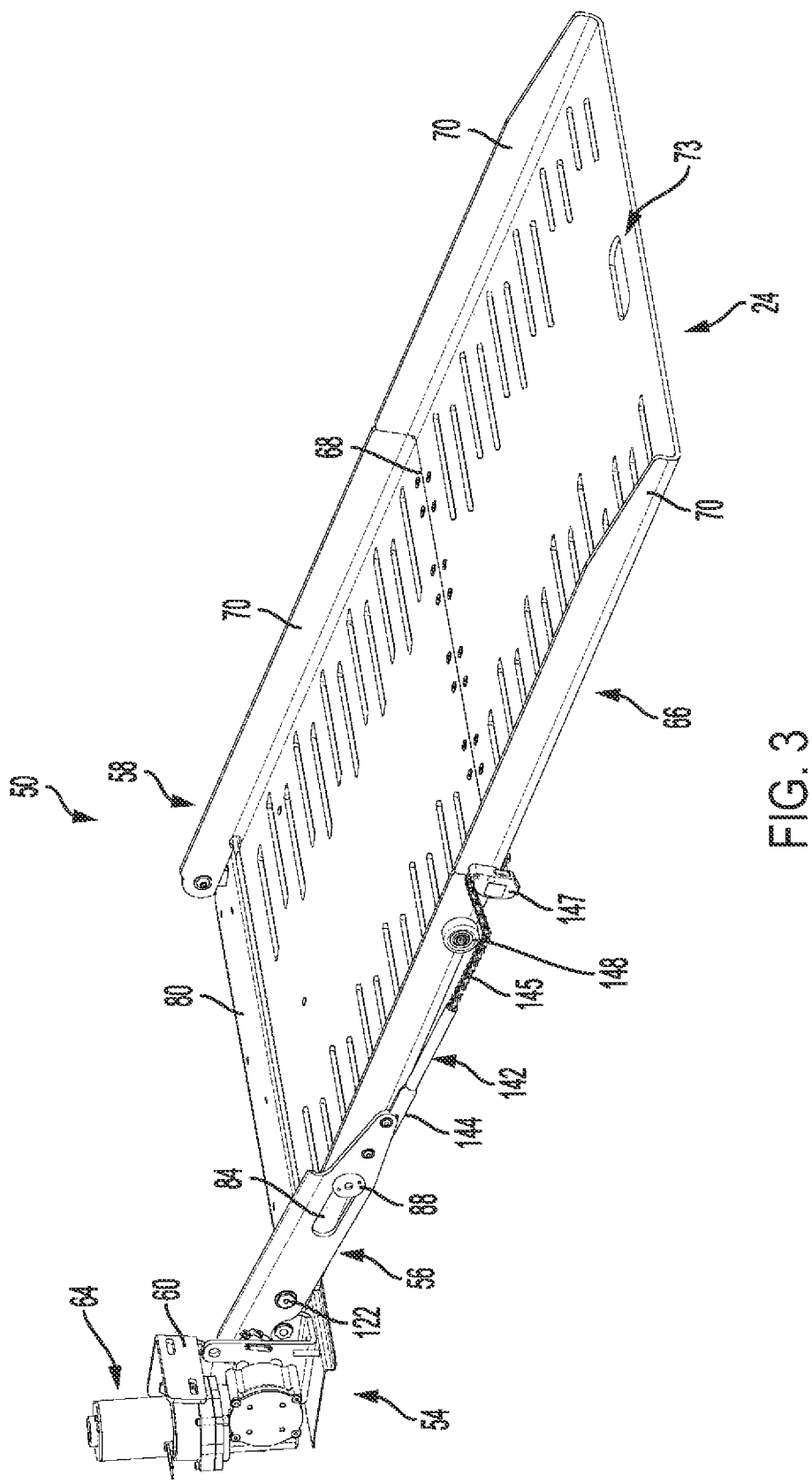
FIG. 3 illustrates a convertible ramp system in a power mode for a passenger vehicle.
Figure 10:
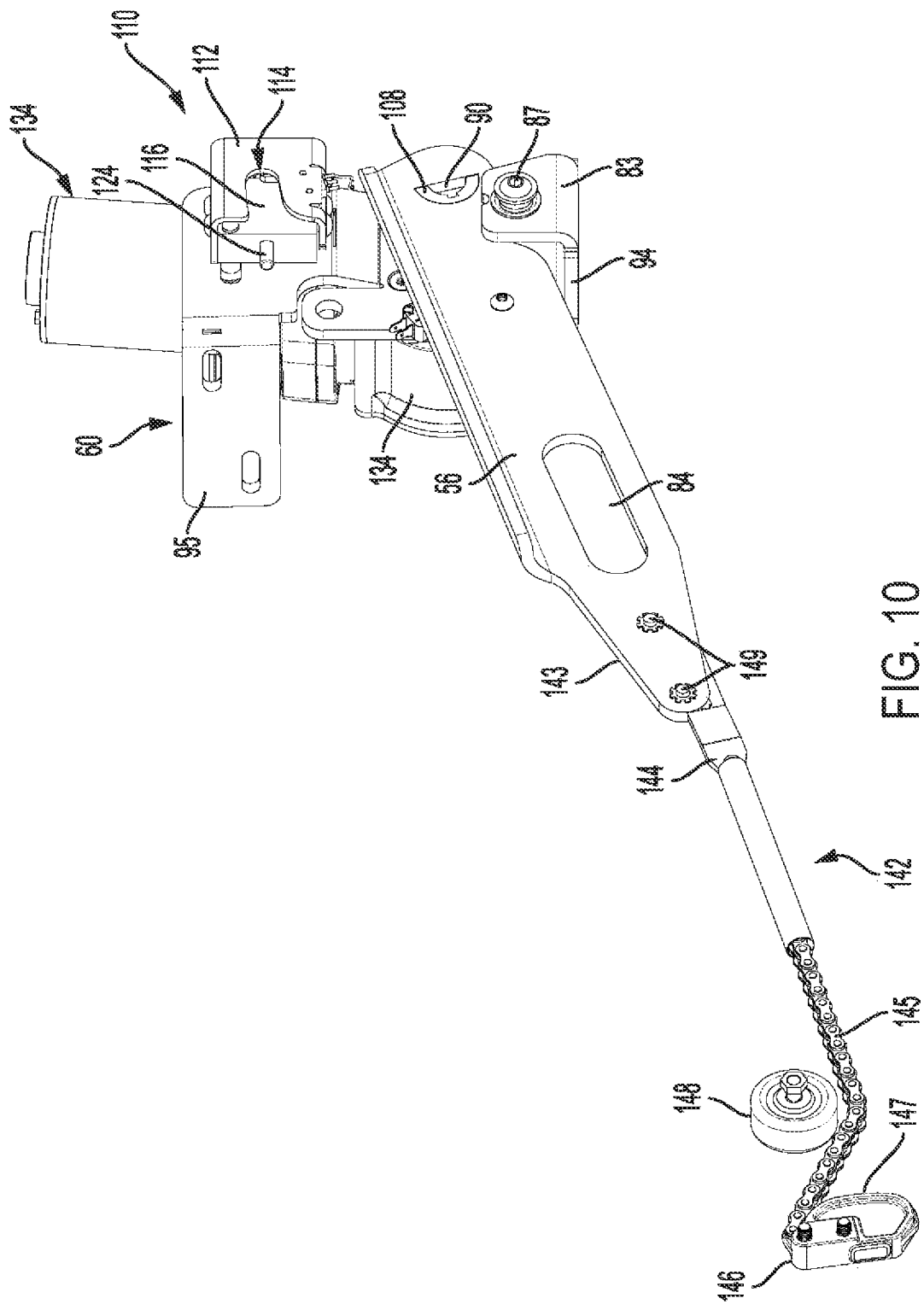
FIG. 10 illustrates a chain link assembly connected to a ramp fold arm to operate the ramp in a power mode.

To further modify the convertible ramp system 50 from the manual mode to the power mode, a chain link assembly 142 is added to an end 143 of the ramp fold arm 56 as seen in FIG. 10. See also FIG. 3. A rigid chain link 144 is fixedly connected to the end 143 and flexible chain 145 is connected to the link 144. The chain 145 extends from the chain link assembly 142 and is coupled to a chain cam 146 which includes a cam surface 147 about which the chain contacts during ramp movement. A chain wheel 148 guides the chain 145. As seen in FIG. 3, the chain cam 146 is fixedly connected to the sidewall 70 of the second ramp plate 66. The chain wheel 148 is rotatably coupled to the first ramp plate 58. The length of the chain link assembly 142 is adjustable with connectors 149. During the stow operation, the length of the chain 145 is extended to allow ramp 58 and ramp 66 to fold toward each other at the seam 68. During the deploy operation of the ramp assembly 24, the folded ramp assembly 24 extends from the vehicle 10. During the extension, the chain 145 pulls on the chain cam 146 that causes ramp panel 66 to unfold from ramp panel 58, such that each ramp panel becomes substantially coplanar with the adjacent ramp panel at full deployment.

Figure 11:
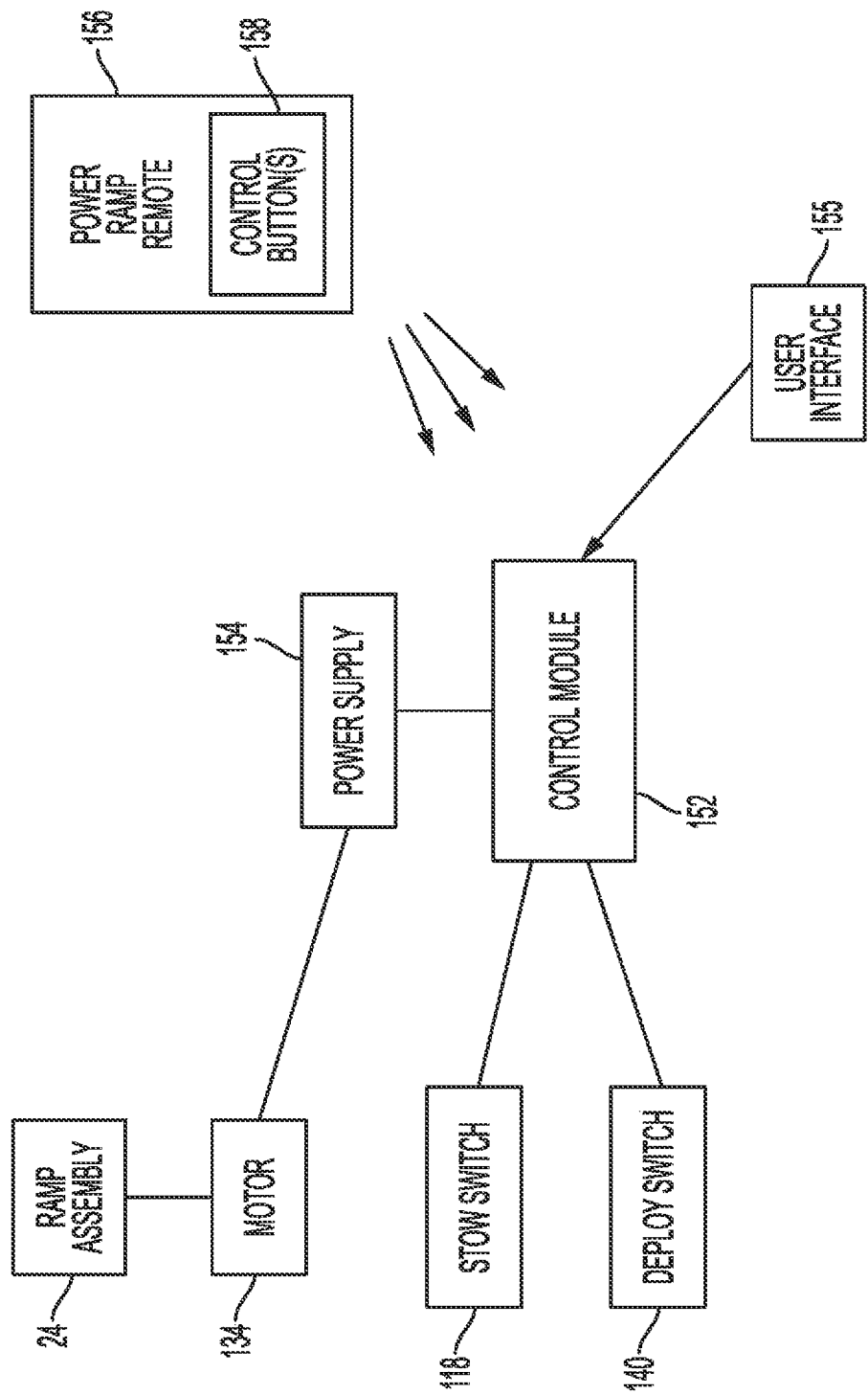
FIG. 11 illustrates a block diagram of a ramp control system.

FIG. 11 illustrates a block diagram of a ramp control system 150 that includes the stow switch 118 and the deploy switch 140 which are electrically coupled to a receiving/control module 152. The motor 134 is electrically coupled to a power supply 154 which supplies power to the motor 134 and to the control module 152. The control module 152 is configured to determine the state of each of the stow switch 118 and the deploy switch 140. In one embodiment, the state of the ramp assembly 24, in either the folded mode or deployed mode is made by a visual inspection. In another embodiment, if the stow switch 118 is closed, the control module 152 transmits a signal to a user interface 155 that indicates that the ramp assembly 24 has reached the stowed position in either the manual mode or the power mode. If the deploy switch 140 is closed, the control module determines that the ramp assembly 24 has been sufficiently deployed and transmits a signal to the power supply 154 to turn off any power being delivered to the motor 134. In one embodiment, the power supply 154 is powered by the vehicle's power supply that includes the vehicle's battery. The power supply 154, in some embodiments, converts the vehicles power to a power appropriate to drive the motor 134.

A power ramp remote 156 is used with the powered ramp system and includes one or more control buttons 158. In one or more embodiments, the power ramp remote 156 is a key fob and is configured to wirelessly transmit control signals to the control module 152, which includes a wireless signal receiver. The control button 158 includes, in different embodiments, a deploy button, a stow button, an on button, an off button, or a single button that toggles between the functions of deploy and stow. In another embodiment, the ramp remote 156 includes only a stow button and a deploy button.

A relay (not shown) located within the control module 152 responds to activation of the control buttons 158. If the ramp assembly 24 is in the stow position, activation of the relay turns on the motor 134 to start deployment of the ramp assembly 24. Once the ramp assembly 24 has extended sufficiently from the vehicle 10, the deploy switch 140 is actuated and the motor is turned off. The ramp assembly 24 then continues to deploy towards the pavement as previously described. After the ramp assembly 24 is no longer needed, activation of the relay in response to the controls button(s) 158 starts a ramp stowing sequence. The motor 134 starts to raise the ramp assembly 24 toward the stowed location determined by actuation of the stow switch 118. Once the stow switch 118 is actuated, the control module generates a signal received by power supply with removes power from and turns the motor off.

The disclosed method and apparatus provides a very quick changeover from the manual ramp system to the power ramp system without removing the ramp from the vehicle. The clock spring retainer plate is initially installed onto the existing clock spring sub-assembly in the manual mode to secure the clock spring to the bimodal bracket 60. The clock spring is securely attached to the bracket 60 with the plate 102 which also allows the clock spring 100 to be removed for the transition to the power ramp mode. Once the clock spring retainer plate 102 is removed, the ramp assembly 24 is converted to the powered ramp system by installing the motor 134 and connecting the appropriate wiring. Customers that initially purchase a manually extending ramp are now able to retrofit the vehicle from the manual ramp system to the power ramp system. In addition, if the clock spring and other related parts are retained after retrofitting to the power ramp system, the powered ramp system can be returned to the manual ramp system using the saved parts.

Figure 12:
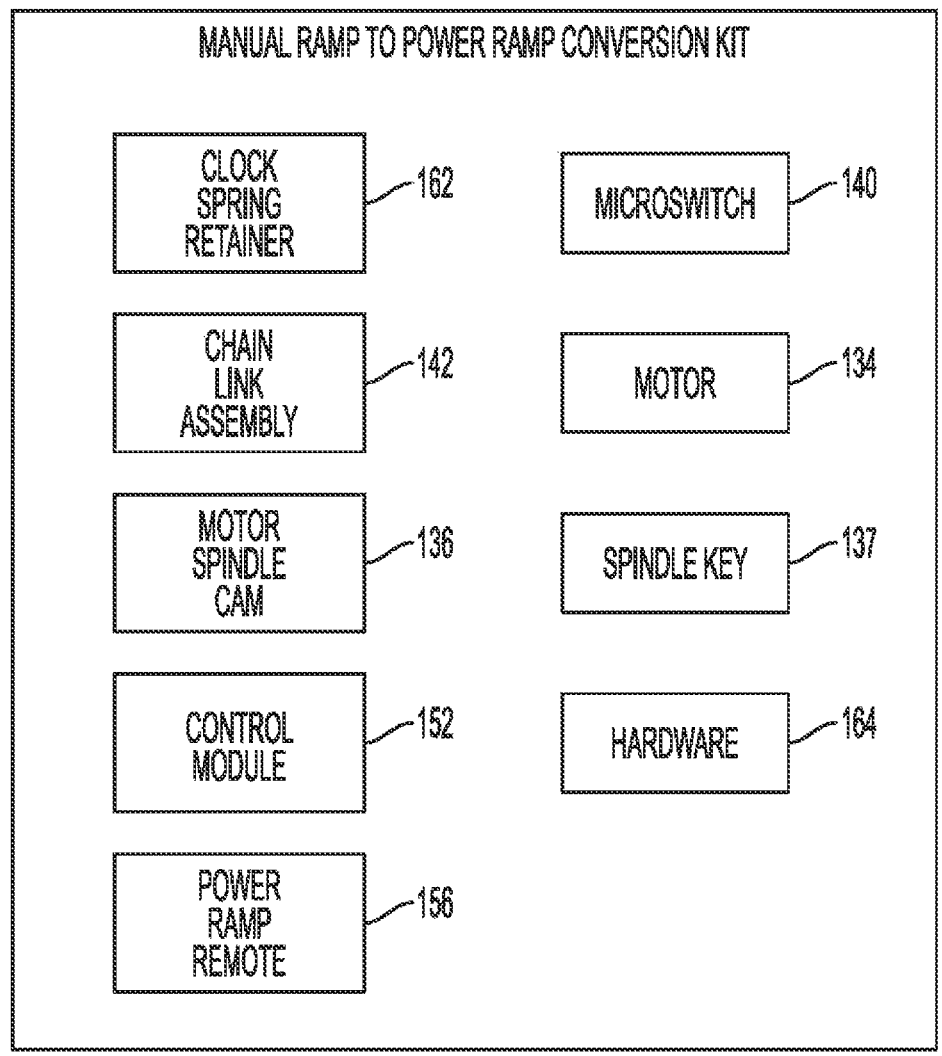
FIG. 12 illustrates a manual ramp to power ramp conversion kit.

As seen in FIG. 12, a manual ramp to power ramp conversion kit 160 is configured to convert, or retrofit, the manual ramp system to power ramp system. The kit 160 includes the necessary parts to convert from one ramp system to the other. As seen in FIG. 12, the kit 160 includes the motor 134, the spindle key 137, the motor spindle cam 136, the microswitch 140, and the chain link assembly 142. In addition, the kit includes a clock spring retainer 162, which holds the clock spring in a wound condition, as would be understood by one skilled in the art. In one embodiment, the clock spring retainer 162 is not included. The kit further includes kit hardware, including various connectors including screws, bolts, and nuts to attach the kit parts to the bracket 60. In one or more embodiments, the kit also includes the control module 152 and the power ramp remote 156

In one or more embodiments, the kit 160 is a prepackaged kit wherein each of the parts is contained within a container configured to hold all of the parts. In another embodiment, the kit includes separately packaged parts, each of which are purchased as a kit sufficient to make the conversion.

While exemplary embodiments incorporating the principles of the present invention have been disclosed herein, the present invention is not limited to the disclosed embodiments. Instead, this application is intended to cover any variations, uses, or adaptations of the invention using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this invention pertains and which fall within the limits of the appended claims.

What is claimed is:

1. A convertible wheelchair ramp system for a vehicle, the convertible wheelchair ramp system including a manual ramp configuration and a power ramp configuration, the convertible wheelchair ramp system comprising:
a spring for use in the manual ramp configuration;
a motor for use in the power ramp configuration; and,
a common ramp assembly for use in both the manual ramp configuration and the power ramp configuration, the common ramp assembly including a first ramp plate operatively coupled to the spring in the manual ramp configuration and to the motor in the power ramp configuration, whereby, in the manual ramp configuration, the motor is decoupled from the common ramp assembly and the spring is configured to assist an individual moving the first ramp plate between a stowed position and a deployed position and, in the power ramp configuration, the spring is decoupled from the common ramp assembly and the motor is configured to power the first ramp plate between the stowed position and the deployed position.

2. The convertible wheelchair ramp system of claim 1, wherein:
the common ramp assembly further includes a common collar;
the spring is operatively connected to a first spindle;
the motor is operatively connected to a second spindle; and, the common collar is operatively coupled between the first ramp plate and the first spindle in the manual ramp configuration and operatively coupled between the first ramp plate and the second spindle in the power ramp configuration.

3. The convertible wheelchair ramp system of claim 2, wherein:
the common ramp assembly further includes a common ramp fold arm for use in both the manual ramp configuration and the power ramp configuration; and
the common ramp fold arm is operatively coupled between the first ramp plate and the common collar.

4. The convertible wheelchair ramp system of claim 3, wherein:
the common ramp assembly further includes a bimodal bracket; and
the bimodal bracket supports the spring in the manual ramp configuration and supports the motor in the power ramp configuration.

5. The convertible wheelchair ramp system of claim 4, further comprising a chain link assembly for use in the power ramp configuration, wherein,
the common ramp assembly further includes a second ramp plate pivotable relative to the first ramp plate between a folded position and an unfolded position; and
in the power ramp configuration, the chain link assembly is operatively coupled between the common ramp fold arm and the second ramp plate, whereby the chain link assembly moves the second ramp plate to the unfolded position as the first ramp plate moves to the deployed position and moves the second ramp plate to the folded position as the first ramp plate moves to the stowed position.

6. The convertible wheelchair ramp system of claim 1, wherein:
the common ramp assembly further includes a common ramp fold arm; and
the common ramp fold arm is operatively coupled between the first ramp plate and the spring in the manual ramp configuration and operatively coupled between the first ramp plate and the motor in the power ramp configuration.

7. The convertible wheelchair ramp system of claim 6, further comprising a chain link assembly for use in the power ramp configuration, wherein,
the common ramp assembly further includes a second ramp plate pivotable relative to the first ramp plate between a folded position and an unfolded position; and
in the power ramp configuration, the chain link assembly is operatively coupled between the common ramp fold arm and the second ramp plate, whereby the chain link assembly moves the second ramp plate to the unfolded position as the first ramp plate moves to the deployed position and moves the second ramp plate to the folded position as the first ramp plate moves to the stowed position.

8. The convertible wheelchair ramp system of claim 1, wherein:
the common ramp assembly further comprising a bimodal bracket; and
the bimodal bracket supporting the spring in the manual ramp configuration and supporting the motor in the power ramp configuration.

9. The convertible wheelchair ramp system of claim 1, further comprising a chain link assembly for use in the power ramp configuration, wherein,
the common ramp assembly further includes a second ramp plate pivotable relative to the first ramp plate between a folded position and an unfolded position; and
in the power ramp configuration, the chain link assembly is operatively coupled between the motor and the second ramp plate, whereby the chain link assembly moves the second ramp plate to the unfolded position as the first ramp plate moves to the deployed position and moves the second ramp plate to the folded position as the first ramp plate moves to the stowed position.

10. A method of converting a manual wheelchair ramp system to a power wheelchair ramp system, the manual wheelchair ramp system including a spring and a common ramp assembly including a first ramp plate operatively coupled to the spring, whereby the spring is configured to assist an individual moving the first ramp plate between a stowed position and a deployed position, the method comprising;
decoupling the spring from the first ramp plate;
coupling a motor to the first ramp plate, whereby the motor is configured to power the first ramp plate between the stowed position and the deployed position.

11. The method of claim 10, wherein decoupling the spring from the first ramp plate includes removing the spring from the manual wheelchair ramp system.

12. The method of claim 11, wherein the manual wheelchair ramp system is converted to the power wheelchair ramp system without decoupling the first ramp plate from the common ramp assembly.

13. The method of claim 11, wherein:
the spring is operatively connected to a first spindle;
the motor is operatively connected to a second spindle;
the common ramp assembly further includes a common collar operatively coupled between the first ramp plate and the first spindle;
decoupling the spring from the first ramp plate includes decoupling the first spindle from the common collar; and
coupling the motor to the first ramp plate includes coupling the second spindle to the common collar.

14. The method of claim 11, wherein:
the common ramp assembly further includes a common ramp fold arm operatively coupled between the first ramp plate and the spring;
decoupling the spring from the first ramp plate includes decoupling the spring from the common ramp fold arm without decoupling the common ramp fold arm from the first ramp plate; and
coupling the motor to the first ramp plate includes coupling the motor to the common ramp fold arm.

15. The method of claim 11, wherein:
the common ramp assembly further includes a bimodal bracket supporting the spring;
decoupling the spring from the first ramp plate includes removing the spring from the bimodal bracket; and
coupling the motor to the first ramp plate includes attaching the motor to the bimodal bracket.

16. The method of claim 11, wherein:
the common ramp assembly further includes a second ramp plate pivotable relative to the first ramp plate between a folded position and an unfolded position;
the method further comprising the step of attaching a chain link assembly to the common ramp assembly, the chain link assembly being operatively coupled between the first ramp plate and the second ramp plate, whereby the chain link assembly moves the second ramp plate to the unfolded position as the first ramp plate moves to the deployed position and moves the second ramp plate to the folded position as the first ramp plate moves to the stowed position.

17. A method of converting a power wheelchair ramp system to a manual wheelchair ramp system, the power wheelchair ramp system including a motor and a common ramp assembly including a first ramp plate operatively coupled to the motor, whereby the motor is configured to power the first ramp plate between the stowed position and the deployed position;
   decoupling the motor from the first ramp plate, wherein decoupling the motor from the first ramp plate includes removing the motor from the power wheelchair ramp system;
   coupling a spring to the first ramp plate, whereby the spring is configured to assist an individual moving the first ramp plate between a stowed position and a deployed position.

18. The method of claim 17, wherein the power wheelchair ramp system is converted to the manual wheelchair ramp system without decoupling the first ramp plate from the common ramp assembly.

* * * * *